US006315531B1

(12) United States Patent
Schwarz

(10) Patent No.: US 6,315,531 B1
(45) Date of Patent: Nov. 13, 2001

(54) JERK PUMP PROVIDED FOR AN INTERNAL COMBUSTION ENGINE, WITH A DAMPENED INTEGRAL SOLENOID VALVE

(75) Inventor: Volker Schwarz, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,372

(22) Filed: Aug. 30, 1999

(30) Foreign Application Priority Data

Aug. 29, 1998 (DE) ............................................. 198 39 522

(51) Int. Cl.[7] ............................... F04B 7/00; F16K 31/02

(52) U.S. Cl. .................. 417/505; 251/129.2; 251/129.16

(58) Field of Search ......................... 417/505; 251/129.2, 251/129.16; 335/277

(56) References Cited

U.S. PATENT DOCUMENTS

| | | | |
|---|---|---|---|
| 4,766,405 | * 8/1988 | Daly et al. | 335/257 |
| 5,123,626 | * 6/1992 | Schlagmuller et al. | 251/129.02 |
| 5,139,224 | * 8/1992 | Bright | 251/50 |
| 5,172,887 | * 12/1992 | Cross et al. | 251/129.19 |
| 5,203,538 | * 4/1993 | Matsunaga et al. | 251/129.19 |
| 5,299,776 | * 4/1994 | Brinn, Jr. et al. | 251/77 |
| 5,427,352 | * 6/1995 | Brehm | 251/64 |

FOREIGN PATENT DOCUMENTS

| | | |
|---|---|---|
| 4020951A1 | 1/1992 | (DE) . |
| 19641952A1 | 4/1998 | (DE) . |
| 19708104A1 | 9/1998 | (DE) . |

OTHER PUBLICATIONS

MTZ Motortechnische Zeitschrift 57 (1996) 4, Neu Motoren "Thermodynamik OM 904 LA".

* cited by examiner

*Primary Examiner*—Timothy S. Thorpe
*Assistant Examiner*—Timothy P. Solak
(74) *Attorney, Agent, or Firm*—Crowell & Moring LLP

(57) ABSTRACT

A jerk pump provided for an internal combustion engine has an integral solenoid valve in which a pump plunger driven by a cam delivers fuel at high pressure through a channel that extends in the pump housing and through an injection line to an injection nozzle. An armature of the solenoid valve cooperates with a spring-loaded valve piston by which the channel-guiding high-pressure side can be connected with a low-pressure side. In order at least largely to avoid rebounding of the solenoid valve in such jerk pumps, provision is made such that the valve piston has an absorbent body held in its resting position by spring force, said absorbent body striking a stop body that holds the valve piston in its closed position when the valve piston is resting on its valve seat.

4 Claims, 2 Drawing Sheets

JERK PUMP PROVIDED FOR AN INTERNAL COMBUSTION ENGINE, WITH A DAMPENED INTEGRAL SOLENOID VALVE

BACKGROUND AND SUMMARY OF THE INVENTION

This application claims the priority of German application 198 39 522.1, filed in Germany on Aug. 29, 1999, the disclosure of which is expressly incorporated by reference herein.

The invention relates to a jerk pump provided for an internal combustion engine, with an integral solenoid valve in which a pump plunger driven by a cam delivers fuel at high pressure through a channel that extends in the pump housing and through an injection line to an injection nozzle, and in which an armature of the solenoid valve cooperates with a spring-loaded valve piston by which the high-pressure side guiding the channel can be connected with a low-pressure side.

Jerk pumps of this kind are known from MTZ Motortechnische Zeitschrift 57 (1996) 4, FIGS. 2 and 3, from Neue Motoren "Thermodynamik OM 904 LA, FIGS. 2 and 3, and from German Patent Document No. DE 196 41 952 A1 in which the valve piston permanently connected with the armature supports a spring plate that abuts a pressure shoulder of the valve piston by spring force. The valve piston is pressed against a valve stop by the spring force. As soon as the solenoid valve is activated, the valve piston strikes its valve seat against the spring force and interrupts the free connection between the high-pressure side and the low-pressure side. Injection begins and is terminated again only when the solenoid valve is deactivated and the pressure on the high-pressure side collapses.

In designs of this kind, because of the high switching rate, rebounding of the valve piston or re-opening of the valve cannot be avoided.

Hence, a goal of the invention is to provide simple means on the solenoid valve according to the species that minimize the rebounding of the valve piston or even prevent it entirely.

This goal is achieved by preferred embodiments of the invention by providing a jerk pump for an internal combustion engine, comprising: an integral solenoid valve in which a pump plunger driven by a cam delivers fuel under high pressure through a channel that extends in a pump housing and through an injection line to an injection nozzle, an armature of the solenoid valve cooperating with a spring-loaded valve piston by which a channel-guiding high-pressure side can be connected with a low-pressure side, wherein the valve piston has an absorbent body held in a resting position by spring force, said body striking a stop body that is in an operating connection with valve piston when the valve piston is on its valve seat.

Further advantageous features of preferred embodiments of the present invention are described below and in the claims.

As a result of the special arrangement of an absorbent body, it is possible to suppress and/or eliminate the undesired re-opening of the valve and/or the multiple rebounding of the valve piston.

In the resting state, the absorbent body is located at its stop or in its initial position. After the solenoid coil is energized, the valve piston is moved in the closing direction together with the absorbent body. As soon as the valve piston strikes its valve seat, the absorbent weight moves further in the closing direction under the influence of inertia. At the moment when the valve piston wants to rebound from its valve seat, the absorbent weight reaches its sleeve-shaped stop body. An opposite momentum is then generated that counteracts the rebounding of the valve piston.

When the valve opens, the absorbent weight can follow the valve piston only after a delay because of its mass inertia. As a result, an opposite momentum is generated that counteracts the rebounding of the valve piston from the stop.

In German Patent Document DE 197 08 104 A1, published subsequently, and in German Patent Document DE 40 20 951 A1, absorbent bodies for solenoid valves are mentioned, but an impact of the absorbent body against a stop body in an operating connection with the valve piston is not provided for closing movements.

Other objects, advantages and novel features of the present invention will become apparent from the following detailed description of the invention when considered in conjunction with the accompanying drawings.

DETAILED DESCRIPTION OF THE DRAWINGS

Figure 1:
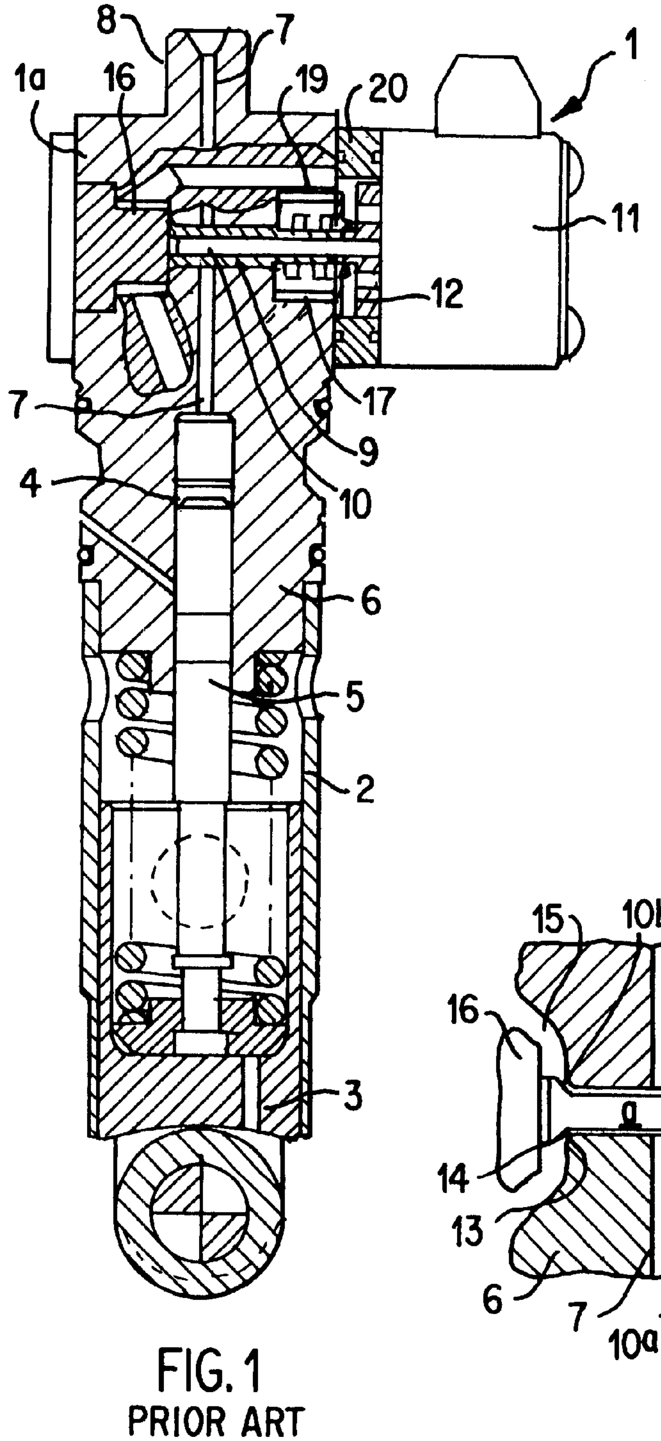
FIG. 1 PRIOR ART
FIG. 1 is a sectional view showing a jerk Pump with a solenoid valve according to the prior art.
Figure 2:
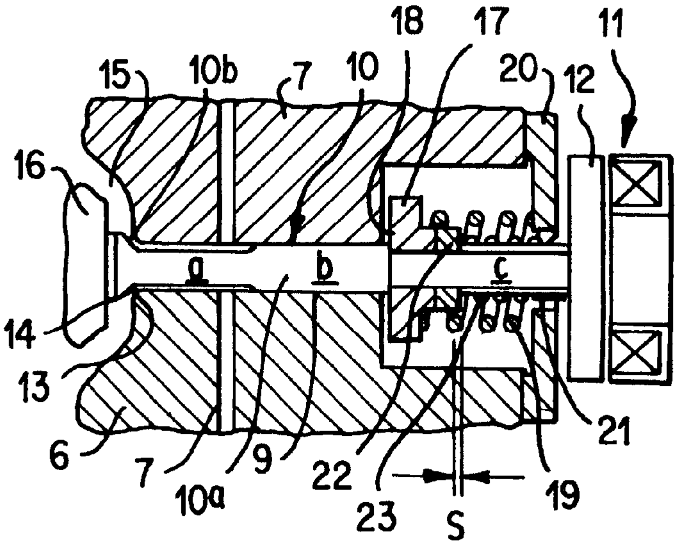
FIG. 2 is a sectional enlarged view of a solenoid valve and absorbent body of a jerk pump according to the invention.

A jerk pump 1 according to FIG. 1 includes a roller tappet 3 guided displaceably lengthwise in a bushing 2 as well as a pump plunger 5 delimiting a pump working chamber 4. From the pump working chamber 4, a channel 7 extends through a pump housing 6 and terminates at a connecting stub 8 at the head part 1*a* of jerk pump 1.

Connecting stub 8 is provided for an injection line connected to an injection nozzle and not shown in greater detail.

In the head part 1*a* of jerk pump 1, channel 7 intersects a transverse bore 9 in which a valve piston 10 of a solenoid valve: 11 is mounted displaceably lengthwise. The valve piston 10 permanently connected with an armature 12 consists of a piston shaft 10*a* formed stepwise and a conical sealing part 10*b* that fits the conical seat surface 13 in the pump housing 6.

Piston shaft 10*a* has three sections a, b, and c, of which the middle section b has the largest diameter, while the section a on the valve seat side, like the section c that faces the armature 12, is made with a small diameter.

The section a on the valve seat side delimits an annular intermediate chamber 14 in cross bore 9 which connects channel 7 on the high-pressure side with a low-pressure side 15 when the valve is open. In the open position, valve piston 10 abuts a valve stop 16 located in pump housing 6.

The section c of the piston shaft on the armature side supports a spring plate 17 that abuts a pressure shoulder 18 and serves as a support for a compression spring 19 that operates in the opening direction of a valve piston 10, said spring also abutting a sealing part 20 fastened to pump housing 6.

The section c on the armature side is surrounded by a stop body 21 that acts as a spacing bushing, between which said stop body 21 and the spring plate 17 an absorbent body 22 is guided displaceably lengthwise. This absorbent body 22 is pressed against spring plate 17 by a spring 23 that surrounds the spacing bushing and abuts the armature 12. Compression spring 19 and spring 23 are concentric with respect to one another.

Figure 3:
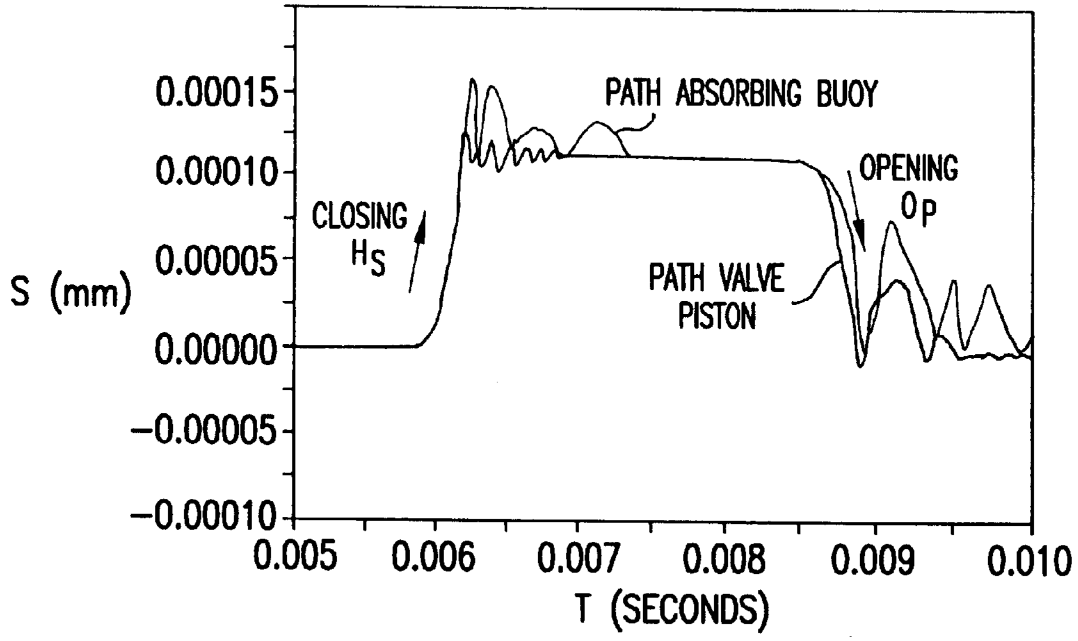
FIG. 3 shows a graph that indicates the travel of the valve piston cooperating with the absorbent body.
Figure 4:
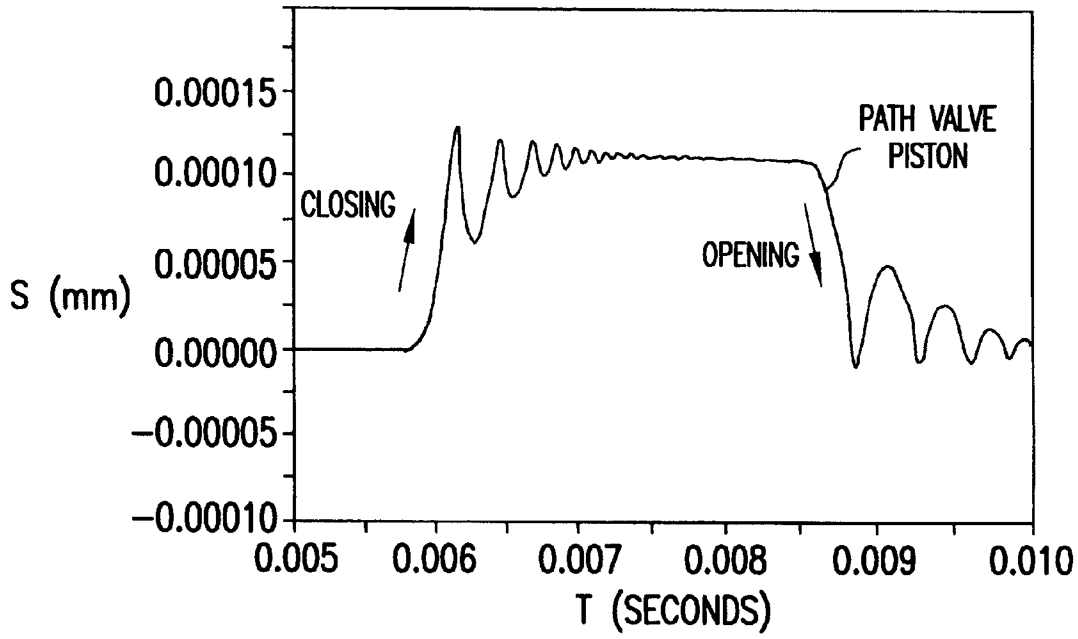
FIG.4 PRIOR ART
FIG. 4 shows a graph in which the travel of the valve piston is supported without providing the absorbent body according to the prior art.

A distance defined to correspond to distance S is provided between the absorbent body 22 and the spacing bushing 21. With a specific design of the absorbent weight and distance S the rebound of the valve piston 10 is considerably reduced, as a comparison between the design according to the invention in the graph in FIG. 3 and the known design according to FIG. 4 will show. In FIGS. 3 and 4, the respective closing stroke $H_s$ and opening stroke $H_ö$ of the valve piston are shown, while in FIG. 3 the travel on the absorbent body 21 is plotted as well.

In FIGS. 3 and 4, the travel S is expressed in millimeters (mm) and the time axis t is graduated in seconds (s).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Jerk pump for an internal combustion engine, comprising:

an integral solenoid valve in which a PUMP plunger driven by a cam delivers fuel under high pressure through a channel that extends in a pump housing and through an injection line to an injection nozzle, an armature of the solenoid valve cooperating with a spring-loaded valve piston by which a channel-guiding high-pressure side can be connected with a low-pressure side, a spring plate secured to the piston shaft of the valve piston, and a compression spring operating to open the valve and abutting said spring plate with one spring end, while the other spring end abuts a closing part on the pump housing, wherein an energy absorbent body associated with the valve piston is held in a resting position by spring force, said absorbent body, upon energizing of a solenoid coil, striking a stop body that is in an operating connection with the valve piston when the valve piston is on a valve seat, wherein the stop body is permanently connected with the armature and the absorbent body is mounted displaceably lengthwise on the piston shaft and is located between the stop body and the spring plate, and wherein a further spring presses the absorbent body against the spring plate.

2. Jerk pump according to claim 1, wherein the stop body is designed as a spacing bushing that surrounds the piston shaft, said spacing bushing being surrounded by the further spring.

3. A jerk pump assembly for supplying fuel to an internal combustion engine, comprising:

a housing, and an integral solenoid valve in which a pump plunger driven by a cam delivers fuel under high pressure through a channel extending in the housing and through an injection line to an injection nozzle, wherein an armature of the solenoid valve cooperates with a spring loaded valve piston to selectively connect a channel high pressure and low pressure side, wherein the valve piston is surrounded by an absorbent body, said absorbent body being movable with respect to the valve piston during valve piston movements and operable to dampen rebounding of the valve piston during jerk pump operations, wherein upon energizing of a solenoid coil to close the valve, said absorbent body strikes a stop body in operable connection with the valve piston when the valve piston is on a valve seat, wherein the absorbent body associated with the valve piston is held in a resting position by spring force and upon energizing of a solenoid coil strikes s stop body that is operatively connected with the valve piston when the valve piston is on a valve seat, wherein a spring plate is secured to the piston shaft of the valve piston, and a compression spring operates to open the valve and abuts the spring plate with one spring end, while the other spring end abuts a closing part on the housing, wherein the stop body is permanently connected with the armature, and the absorbent body is mounted displaceably lengthwise on the piston shaft and is located between the stop body and the spring plate, and wherein a further spring presses the absorbent body against the spring plate.

4. A jerk pump assembly according to claim 3, wherein the stop body surrounds the valve piston and forms a stop limit for movement of the absorbent body in a closing position.

* * * * *